United States Patent
Fried et al.

(10) Patent No.: US 6,912,331 B2
(45) Date of Patent: Jun. 28, 2005

(54) PERIODIC ELECTROMAGNETIC WAVEGUIDE STRUCTURES WITH CONTROLLED POLARIZATION PROPERTIES

(75) Inventors: Dale G. Fried, Dedham, MA (US); Jean-Francois Viens, Boston, MA (US); James S. Foresi, Waltham, MA (US); Maksim A Skorobogatiy, Brighton, MA (US); Michael H. Lim, Cambridge, MA (US)

(73) Assignee: Cambrius Inc., Winchester, MA (US)

( * ) Notice: Subject to any disclaimer, the term of this patent is extended or adjusted under 35 U.S.C. 154(b) by 205 days.

(21) Appl. No.: 10/096,297

(22) Filed: Mar. 12, 2002

(65) Prior Publication Data

US 2003/0174945 A1 Sep. 18, 2003

(51) Int. Cl.⁷ ................................................. G02B 6/12
(52) U.S. Cl. .............................. 385/14; 385/11; 385/37; 385/129; 385/130; 385/27; 385/131
(58) Field of Search ............................... 385/1, 2, 3, 11, 385/31, 37, 14, 129, 130, 131, 27, 28, 15, 132

(56) References Cited

U.S. PATENT DOCUMENTS

| | | | | |
|---|---|---|---|---|
| 5,103,456 A | * | 4/1992 | Scifres et al. | 372/50 |
| 5,657,407 A | * | 8/1997 | Li et al. | 385/37 |
| 5,966,483 A | * | 10/1999 | Chowdhury | 385/37 |
| 6,097,863 A | * | 8/2000 | Chowdhury | 385/37 |
| 6,400,509 B1 | * | 6/2002 | Sappey et al. | 359/571 |
| 2001/0014200 A1 | * | 8/2001 | Albert et al. | 385/129 |
| 2003/0174945 A1 | * | 9/2003 | Fried et al. | 385/37 |

OTHER PUBLICATIONS

"A Polarization–Independent Distributed Bragg Reflector Based on Phase–Shifted Grating Structures," Huang et al. *Journal of Lightwave Technology*. Mar. 1996. vol. 14, No. 3.

"Design of Polarization–Insensitive Bragg Gratings in Zero-Birefringence Ridge Waveguides," Wong et al. *IEEE Journal of Quantum Electronics*. Sep. 2001. vol. 37, No. 9.

"TM–Mode Coupling Coefficients in Guided–Wave Distributed Feedback Lasers," Streifer et al. *IEEE Journal of Quantum Electronics*. Feb. 1976. vol. 12, No. 2.

"TE and TM Coupling Coefficient for Index–Gain Multi-grating Waveguides," Debernardi et al. *IEEE Proceedings: Journal of Optoelectronics*. Apr. 1992. vol. 139, No. 2.

* cited by examiner

*Primary Examiner*—Brian M. Healy
(74) *Attorney, Agent, or Firm*—Gauthier & Connors LLP

(57) ABSTRACT

By judicious engineering of grating parameters such as tooth shape, duty cycle and phase offset, the grating strengths and effective indices of the polarization modes of a grated waveguide are adjusted over a wide range of values to achieve a desired level of polarization sensitivity, or insensitivity. In the typical example, the physical geometry of the grating teeth is adjusted so that degenerate behavior ($n_{TE} = n_{TM}$ and $\kappa_{TE} = \kappa_{TM}$) is obtained for two polarization modes; the effective refractive indices and grating strengths are matched for the TE and TM polarization modes. In the current embodiment the sidewall gratings are used in which the tooth profile is selected in order to equalize the grating strength for each polarization mode.

33 Claims, 11 Drawing Sheets

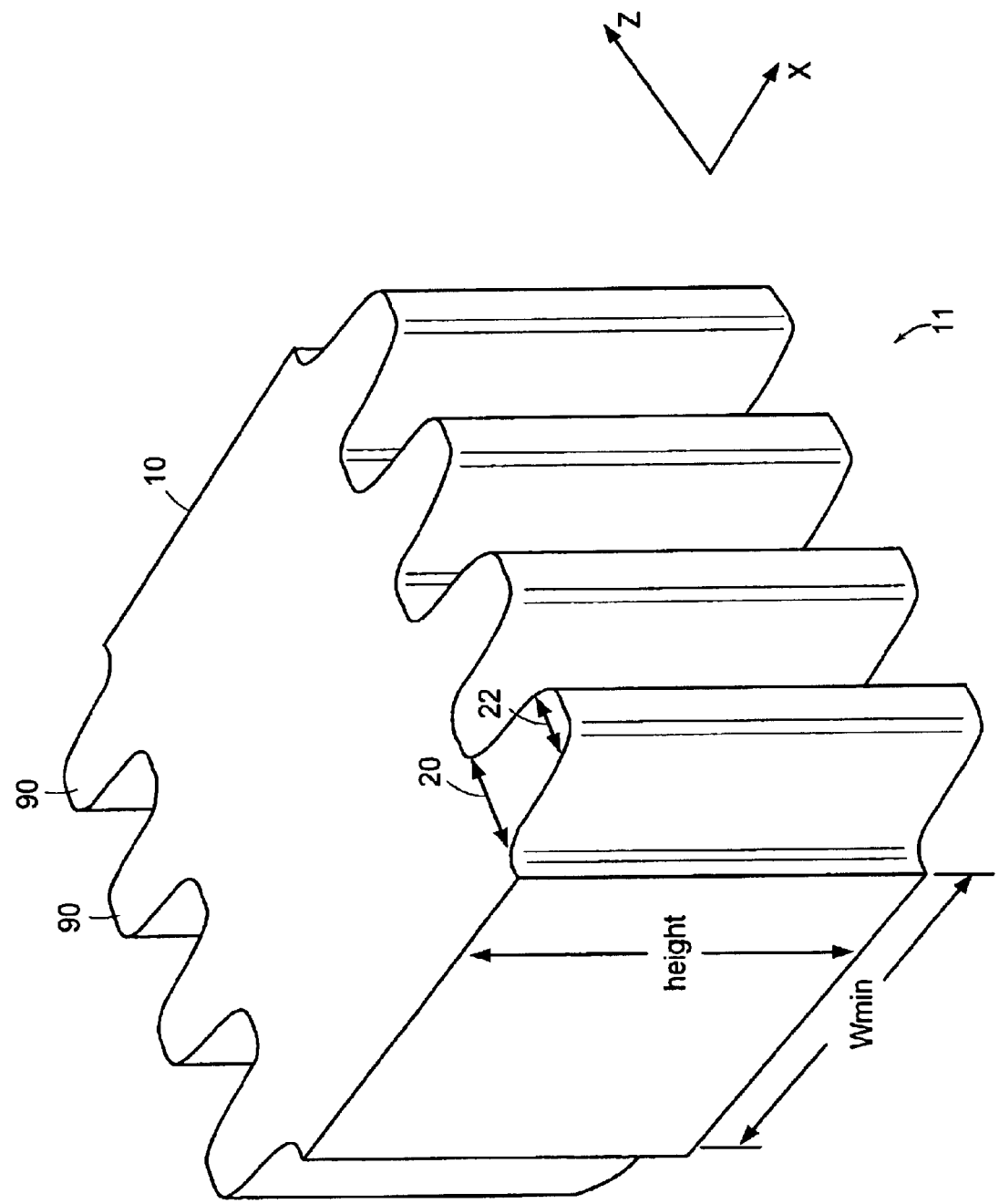

PERIODIC ELECTROMAGNETIC WAVEGUIDE STRUCTURES WITH CONTROLLED POLARIZATION PROPERTIES

BACKGROUND OF THE INVENTION

Polarization control is a significant concern in the design and operation of integrated optical devices. Planar waveguides pose an especially difficult problem for the designer who requires polarization-independent behavior.

In a waveguide, which is generally characterized by an effective index of refraction, $n_{eff}$ the two polarization modes, quasi-TE (Transverse Electric) and quasi-TM (Transverse Magnetic), will experience an effective index which is, in general, different for each polarization:

$$n_{TE}^{eff} \neq n_{TM}^{eff}.$$

An ideal polarization insensitive waveguide has $$n_{TE}^{eff} = n_{TM}^{eff}.$$

This can be accomplished in waveguides with cross-sections that have at least four-fold rotational symmetry so that the TE and TM modes are degenerate. A round optical fiber or a planar waveguide with a square cross-section are examples.

Polarization control becomes more challenging when features are added to the waveguide. For example, periodic structures, such as gratings, can be introduced into a waveguide.

In planar waveguide systems, gratings are typically etched into the top of the waveguide. This process results in distinctive external features called grating teeth that have the effect of creating a periodic variation in the effective refractive index of the waveguide. Gratings are commonly used in wavelength division multiplexing (WDM) systems as channel filters to isolate a particular optical channel, for example, by reflecting waves within a frequency band, called the "stopband".

To obtain polarization insensitivity, a grating must have the identical effect on the TE and TM polarization modes. This characteristic, however, is generally difficult to achieve in monolithically fabricated planar waveguide systems, since the grating is typically not fabricated on all four sides of the waveguide due to inherent limitations in the fabrication process. This breaks the waveguide's four-fold symmetry.

Grating strength, for example, is a characteristic that the planar waveguide system designer must typically balance for each polarization mode. The grating strength, κ, is related to the modal overlap between the propagating field and the grating. Because fields for the polarization modes usually have different cross-sectional shapes, $n_{eff}$ and κ are different for the polarization modes in asymmetric waveguides, which leads to different behavior for the polarization modes.

A number of methods have been proposed to control or reduce polarization sensitivity in grated planar waveguides when four-fold symmetry is not present. These prior art techniques for polarization control, however, suffer from a number of drawbacks. In some instances, they rely on material systems with low refractive index contrast, which is defined as the difference between the refractive index of the waveguide core and the index of the surrounding cladding. It is generally difficult to design physically small, commercially relevant devices using low index contrast material systems, however. In other instances, the prior art techniques can only be applied for relatively narrow bandwidths. In still other instances, the techniques rely on precise control of material stress characteristics during fabrication, which results in low device yields.

SUMMARY OF THE INVENTION

The invention concerns waveguide-grating designs that provide a desired level of polarization sensitivity and a method of designing such grating waveguides. The invention does not require low refractive index differences or complex fabrication, however. Instead, it emphasizes control over grating parameters such as tooth-shape, tooth size, phase shifting between gratings, and grating duty cycle in order to control the strength of the grating with respect to each polarization mode.

In more detail, by judicious engineering of grating parameters, the grating strengths of the polarization modes can be adjusted over a wide range of values and also achieve a desired level of polarization sensitivity, or insensitivity. In the typical example, the physical geometry of the grating teeth is adjusted so that degenerate behavior is obtained for both polarization modes, i.e., the effective refractive indices and grating strengths are matched for the TE and TM polarization modes ($n_{TE}=n_{TM}$ and $\kappa_{TE}=\kappa_{TM}$).

The invention is applicable to polarization control in the surface and sidewall gratings that are used for filtering and coupling, for example, and can be applied to various types of gratings, such as Bragg gratings or chirped gratings. The invention is also applicable to various types of waveguides, such as buried waveguides, rib waveguides, ridge waveguides, and strip metal waveguides. Moreover, although control of polarization effects in the lowest order spatial modes may be preferred, the technique can be applied to higher order spatial modes, as well. The invention is also applicable to the control of the same polarization mode of two different spatial modes.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention.

FIG. 2 is a perspective view of a polarization insensitive buried waveguide with sidewall gratings according to the invention;

DETAILED DESCRIPTION OF THE INVENTION

Figure 1A:
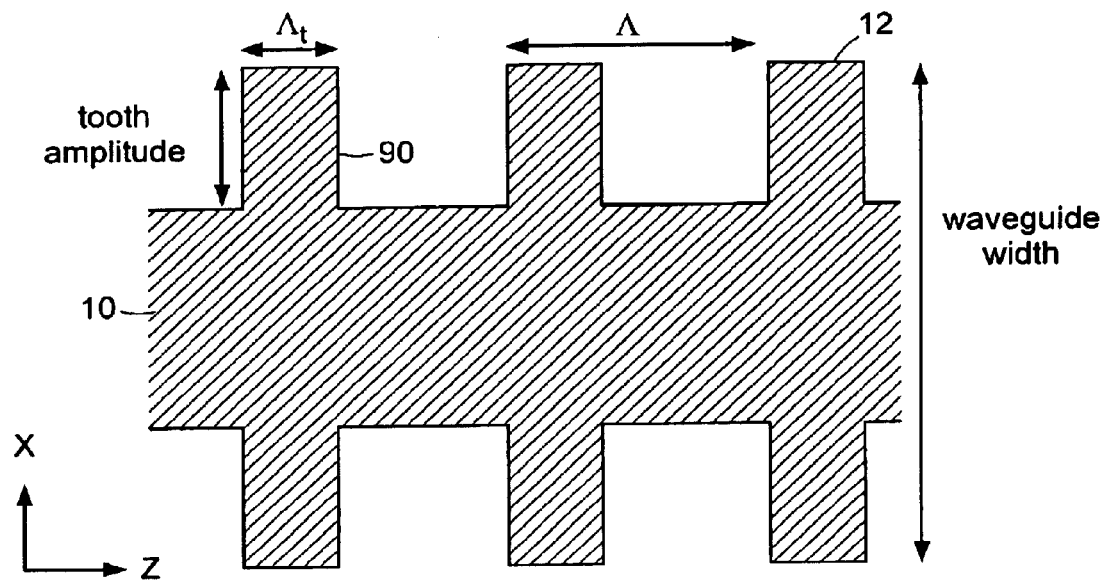
FIG. 1A is a plan view of a waveguide with sidewall gratings having a square tooth shape, illustrating some grated waveguide parameters.

The polarization sensitivity of a waveguide is characterized by the effective indices of the polarization modes, $n_{TE}^{eff}$ and $n_{TM}^{eff}$. The effective indices are affected by the waveguide cross-section, which is defined by the height and width of the waveguide, by the material birefringence, and by the index contrast. For example, a waveguide with no material birefringence and a square cross-section has four-fold rotational symmetry and, hence, has no birefringence (i.e., $n_{TE}^{eff}=n_{TM}^{eff}$), thereby rendering the waveguide polarization insensitive.

Of-course, an exact equality is not possible in actual devices. Thus, for many specifications, a waveguide is said to be polarization insensitive if $\Delta n_{eff}/n_{eff}$ is less than $5*10^5$. More stringent specifications require that $\Delta n_{eff}/n_{eff}$ is less than $1*10^{-5}$.

The addition of a grating to the waveguide creates additional parameters that must be equalized or engineered for the polarization modes in order to achieve polarization insensitivity or control. The grating strength, κ, is related to the modal overlap between the propagating field and the grating. Because fields for the different polarization modes have different cross-sectional shapes, κ can be different for the polarization modes. Here, for many specifications, a waveguide is said to be polarization insensitive if Δκ/κ is less than 10%. More stringent specifications require that Δκ/κ be less than 0.5%.

A grated waveguide (GW) has a number of parameters that determine the general operating response of the grating. A specific grating design typically has a desired operating range and requires a specific center frequency, stopband width, and coupling order. The center radian frequency, $\omega_c$, and the coupling order, q, are related to the effective index, $n_{eff}$, and the period of the grating, Λ, as $$\omega_c = \frac{2\pi c q}{n_{eff}} \frac{1}{\Lambda} \qquad (1)$$

where c is the speed of light. The stopband width, Δω, is related to the grating strength, κ, as $$\Delta\omega = \frac{2c\kappa}{n_g} \qquad (2)$$

where $n_g$ is the modal group index. A wider operating range requires a stronger grating so that the grating produces a wider stopband. A grating is typically designed for a particular application and material system. By selecting a center frequency, a stopband width, and a material system, the grating strength and period are determined. Therefore, κ, $n_{eff}$, and Λ cannot be independently adjusted to obtain a desired polarization sensitivity.

For example, the cross-section of the GW can be adjusted so that $n_{TE}^{eff}=n_{TM}^{eff}$. In this case, the propagation velocities of the polarization modes (PMs) are matched. However, the cross-section of the GW cannot subsequently be arbitrarily adjusted to obtain any desired grating strength polarization sensitivity. Moreover, the cross-section of the GW cannot be arbitrarily adjusted to match $\kappa_{TE}$ and $\kappa_{TM}$ to achieve polarization insensitivity while simultaneously maintaining $$n_{TE}^{eff} = n_{TM}^{eff}.$$

Figure 1B:
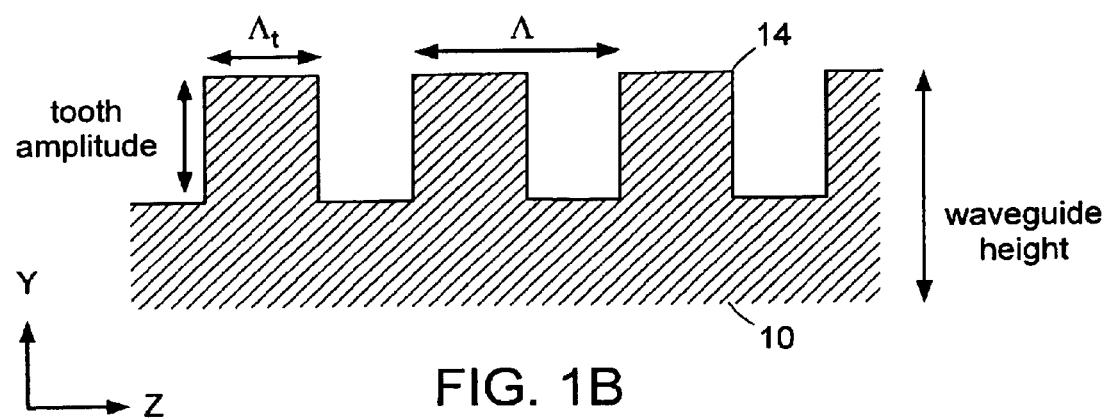
FIG. 1B is a side view of a waveguide with a top surface grating having square tooth shape, illustrating the grated waveguide parameters.

FIGS. 1A and 1B illustrate parameters associated with the grated waveguide 10 that can be adjusted, according to the invention, in order to achieve a targeted level of polarization insensitivity in terms of κ and $n_{eff}$, while obtaining the design requirements associated with the center frequency and a stopband width, for example.

The duty cycle, D, of the grating teeth and the tooth amplitude can be controlled to obtain the desired behavior. In the illustrated square shaped teeth, the duty cycle is defined as:

$$D = \frac{\Lambda_t}{\Lambda} \qquad (3)$$

where $\Lambda_t$ is the width of the grating tooth 90 and Λ is the grating period. FIG. 1A is a plan view of a waveguide 10 with sidewall gratings 12 having a square tooth shape, and FIG. 1B is a side view of a waveguide 10 with top surface gratings 14 having a square tooth shape. The tooth amplitude is the distance from the peak of the tooth to the trough of the tooth.

FIG. 2 is a perspective view of a polarization insensitive buried waveguide 10 with sidewall gratings according to the invention. FIG. 2 illustrates other parameters that can be adjusted, i.e., the shape of each period of the varying index of refraction or the grating teeth, in order to control polarization sensitivity. Therefore, in one embodiment of the invention, the shape of each period of the varying index of refraction, or the shape of the grating teeth, is engineered so that a desired polarization sensitivity is achieved by using non-square tooth profiles.

The shape, or profile, of the grating teeth can be used to change the polarization characteristic of the GW because the PMs have different electric field distributions. Therefore, they are affected by the grating differently in a GW that does not have four-fold rotational symmetry. The tooth shape can be used to control the effect of the grating on each PM to obtain a desired polarization sensitivity.

A general characteristic of teeth 90 of the GW 10 is that they have non-square profiles. In effect, the duty cycle of the teeth changes in the direction of the x-axis, in the case of sidewall gratings, or the tooth amplitude, more generally. In the illustrated example, the bases of the teeth are larger than near the tooth tops 22. In this way, polarization modes having different distributions in the x-axis direction see different effective grating duty cycles. Selection of different teeth profiles enables differential tuning of the effective duty cycle and thus the grating strength for each polarization mode.

In some respects, the use of a high refractive index contrast system enables the invention since the high contrast contributes to grating strength even as grating strength is diminished when the duty cycle is shifted away from 50%. In an exemplary embodiment, the material system provides an index contrast between the refractive indices of the waveguides 10 and surrounding cladding layers 11 that is greater than 1%, or preferably a higher contrast of greater than 2%. Presently, a silicon oxy-nitride system is used in which the refractive index of the waveguides 10 is 1.60 and the refractive index of the cladding layers 11 is about 1.44. Thus, $\Delta n/n_{cladding}$ is greater than about 10%.

With the illustrated "wavy" tooth shape, the effective indices of the PMs are significantly equal, and the grating strengths of the PMs are significantly equal, and thus the GW becomes polarization insensitive. Specifically, $\Delta n_{eff}/n_{eff}$ is less than $5*10^5$, and preferably less than $1*10^{-5}$, and $\Delta\kappa/\kappa$ is less than 10%, and preferably less than 0.5%.

According to one design process, since the effective index is primarily dependent on the cross-sectional area of the waveguide, the grating index is first tuned using the cross-sectional area of the waveguide and the waveguide height is specifically adjusted relative to the width, such as $w_{min}$. The height to width ratio of the waveguide cross-section is selected to achieve the desired effective index for each PM and thereby obtaining the desired geometrical birefringence. Since the grating strength is primarily dependent on the tooth amplitude, the grating is designed for the desired $\kappa$ using the tooth amplitude. The tooth shape is used to fine tune the grating strength for each PM to obtain the desired polarization dependence of the grating strength. Therefore, the GW can be designed for a specific $\kappa$, the GW cross-sectional dimensions can be adjusted to obtain the desired birefringence, and the tooth shape can be adjusted to achieve the desired relationship between $\kappa_{TE}$ and $\kappa_{TM}$.

There are an infinite number of tooth shapes or ways to shape a grating tooth. Only subsets of this infinite tooth shape space, however, will result in a desired level of polarization sensitivity. Identifying subsets of tooth shapes or specific tooth shapes that result in a desired level of polarization sensitivity is facilitated by mathematical analysis. Specific tooth shapes that result in a desired level of polarization sensitivity can be identified using an iterative process.

First, a parameterization method for the tooth shape is selected. In one example, the shape and size of the periodic refractive index variation is described by a functional form, such as a square function, a power law function, a polynomial function, a trigonometric function, or combinations of such functions. Ideally, the parameterization has a small number of parameters so that the tooth shapes can be sufficiently varied to achieve the design criteria. Also, the tooth shape parameterization preferably allows the shape of the dielectric material to be varied so that the band splitting of one mode is affected differently from the other.

The functional form may be analyzed using a number of methods, such as first order perturbation theory, beam propagation methods, and finite difference time domain analysis, to estimate the grating strength for the two polarization modes. The grating strengths can also be estimated by analyzing the splitting of the optical energy bands. These functional forms indicate a region of parameter space in which the desired polarization dependence may be achieved.

For a given point in the parameter space described by the functional form, Maxwell's equations for wave propagation in the waveguide are solved. Any of the previously listed techniques may be used, depending on the desired precision. First-order perturbation theory will indicate, analytically, the grating strength for a given mode in the equivalent non-periodic (straight) waveguide. Beam propagation methods may be used to find these unperturbed modes, and certain enhancements may be used to address weak reflection. Finite difference time domain (FDTD) methods can yield the total reflection, and thus grating strength, for a pulse propagating through the system. Frequency domain methods are also well suited to the calculation of optical energy band splittings in periodic structures.

Then the calculated grating strength and effective index are compared to the target values. Any of several techniques may be used to refine the parameters that describe the design. One may apply multiple-variable minimization techniques to a combination of merit functions that encapsulate the design targets. For example, the function to be minimized could be the sum of the squares of the average grating strength, the polarization dependence of the grating strength, and the polarization dependence of the effective index. Alternatively, one may map the parameter space by reanalyzing the functional form for a range of parameter values, and then collapse the parameter space to those combinations of parameter values that simultaneously satisfy the various design constraints. For example, analytic fits to the calculated data may be used to relate two of the parameters so that the grating strength is identical for the two polarization modes.

In the following example, a specific functional form is used to parameterize and analyze a wide range of dual-sidewall grating tooth shapes. For a tooth amplitude d and minimum GW width $w_{min}$, the width of the GW is given by the periodic function:

$$w(z) = w_{min} + 2d \times \begin{cases} m \times \left| \dfrac{z + \Lambda/4}{\Lambda/4} \right|^{\gamma} & -\Lambda/2 \leq z \leq 0 \\ 1 - (1-m) \times \left| \dfrac{z - \Lambda/4}{\Lambda/4} \right|^{\gamma} & 0 \leq z \leq \Lambda/2 \end{cases} \quad (4)$$

Here m is a parameter between 0 and 1, which sets the midpoint at which the curve turns over, and γ is the parameter that varies the curve from cusp-like (γ=0) to triangle-like (γ=1) to square-like (γ=∞).

Figure 3:
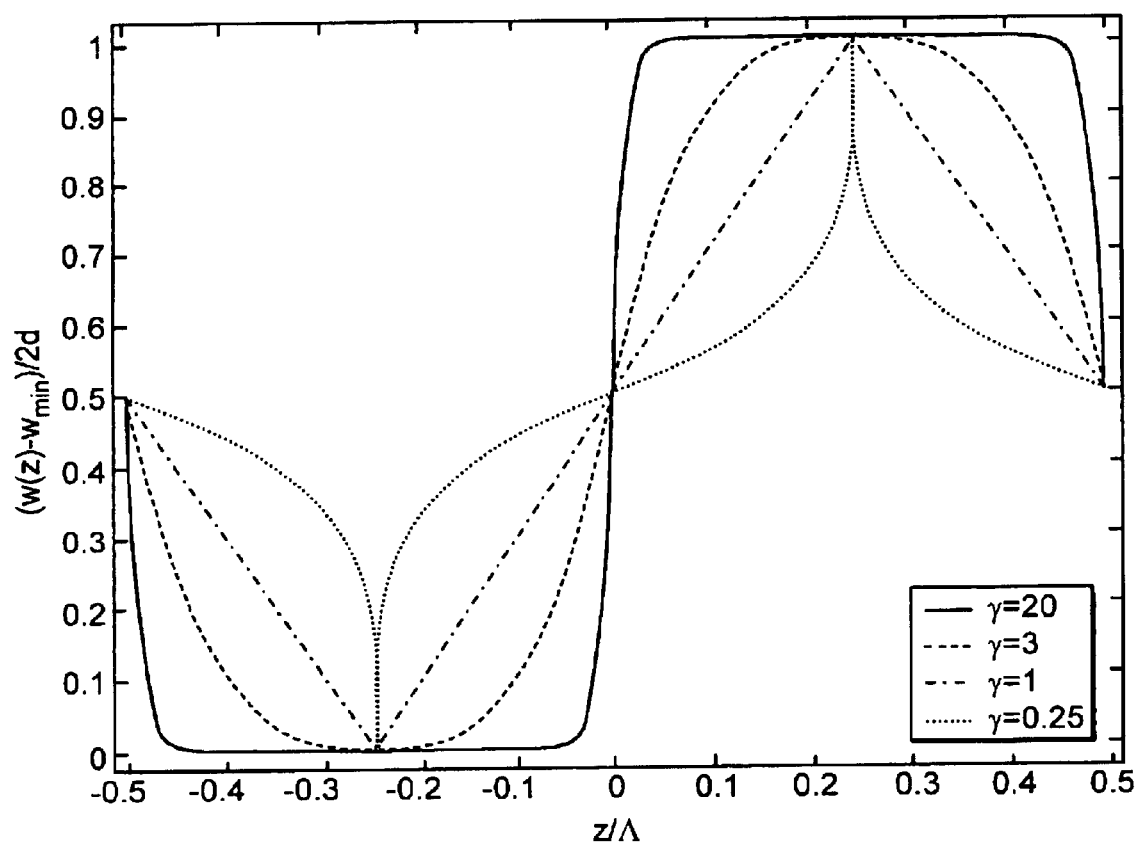
FIG. 3 is a graph showing waveguide width as a function of distance (z) for m=0.5 and various values of the exponent parameter γ, which is used for the design process of the invention.

FIG. 3 is a graph showing waveguide width as a function of z (position along the optical axis), for m=0.5 and various values of the exponent parameter described by Eq. (4).

Figure 4:
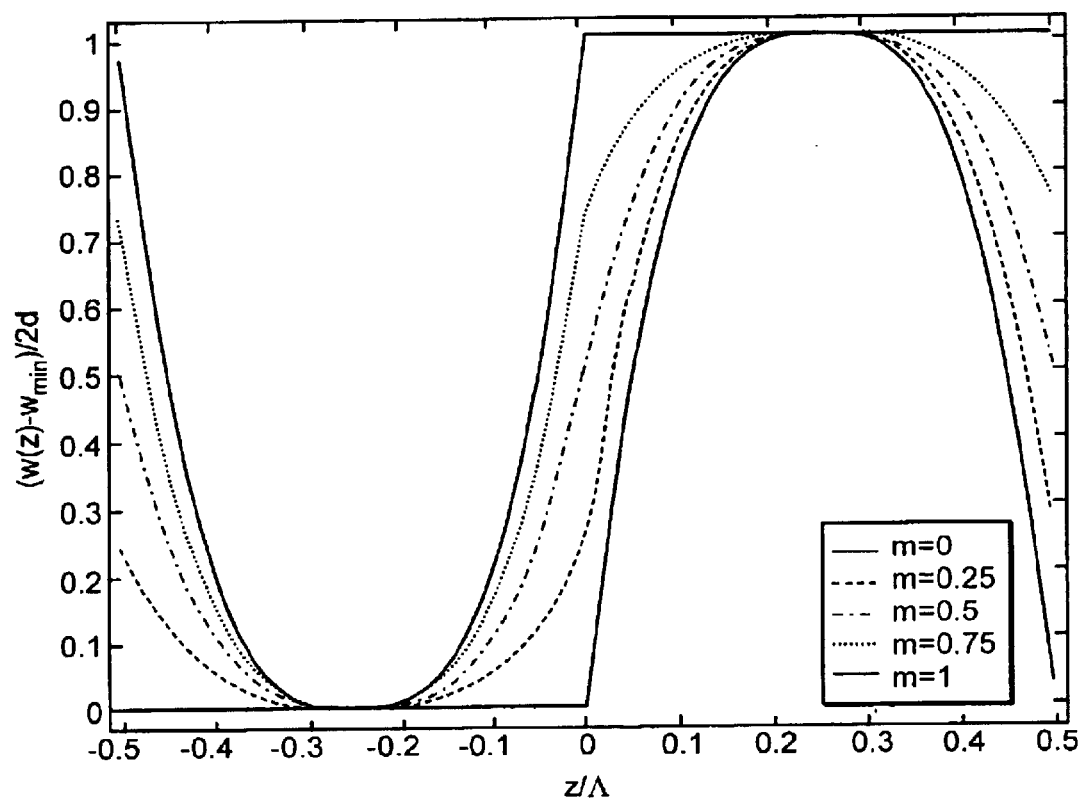
FIG. 4 is a graph showing waveguide width as a function of distance (z) for γ=2 and various values of the midpoint parameter m, which is used for the design process of the invention.

FIG. 4 is a graph showing waveguide width along z, for γ=2 and various values of the midpoint parameter.

To analyze these tooth shapes, the reflection of the first-order spatial mode is examined. In order to test the sensitivity of the grating strength to the parameters m and γ in Eq. (4), the lowest four frequencies at the Bragg wavevector, $k_{Bragg}=\pi/\Lambda$, for a range of m and γ are calculated. These four frequencies give the bandgap, and thus the grating strength, for the two PMs. An exemplary computational structure includes a layer of core material ($n_{core}$=1.60, t=1.30 μm) covered by a thin etch-stop layer ($n_{clad}$=1.4451, t=0.04 μm) covered by another layer of core material of thickness t=0.25 μm. The grating tooth amplitude is d=0.8 μm. The width of the grating in the narrowest region is $w_{min}$=0.6 μm, and in the widest region is 2.2 μm.

Figure 5:
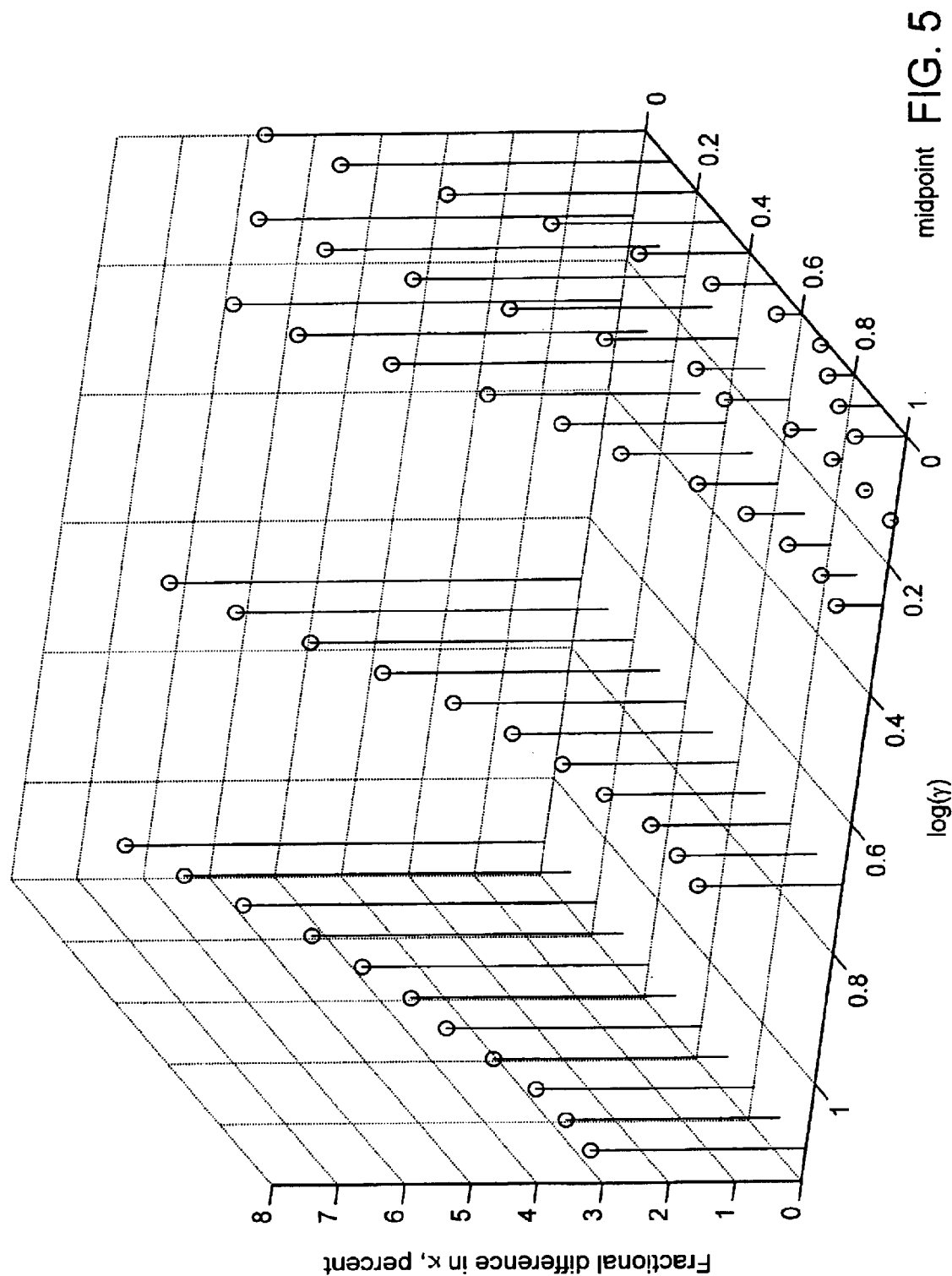
FIG. 5 is a graph showing the fractional difference in the grating strength between polarization modes for a range of values of midpoint parameter m and exponent parameter γ, which graph is used for the design process of the invention.

FIG. 5 is a graph showing the fractional difference in the grating strength between the two polarization modes, in percent, for a range of values of midpoint parameter m and exponent parameter γ. For a significant range of parameters, the grating strengths are within 1% of each other; m>0.6, and log(γ)<0.3 (γ<1.35). This domain will provide adequate polarization insensitivity for most applications.

Figure 6:
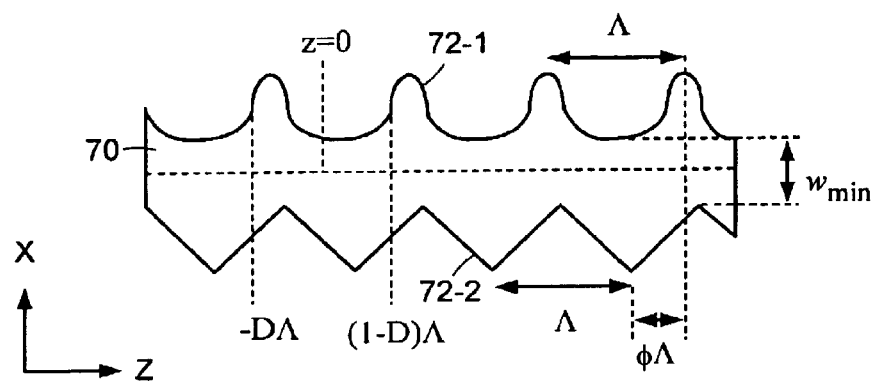
FIG. 6 is a plan view of a waveguide with sidewall gratings having tooth shapes with different duty cycles, shapes, and phase offsets, according to the invention.

FIG. 6 is a plan view of a waveguide 70 with sidewall gratings 72-1, 72-2 having tooth shapes with different duty cycles, shapes, and phase offsets, according to the invention. In this example, the parameter space is increased by using different tooth shapes in each of the two side wall gratings. Grating 72-1 is more wave-shaped with sharp peaks; and grating 72-2 is triangular. Further to illustrate the parameter space, the gratings 72-1 and 72-2 have different duty cycles and a phase offset with respect to each other; the two sidewalls have an offset of φΛ.

Generally, when designing the gratings, each sidewall grating can have a different duty cycle, D, tooth amplitude, d, midpoint, m, and exponent, γ, and is described by the following functional form $$W(z) = \frac{w_{min}}{2} + d \times \begin{cases} m \times \left| \frac{2z}{D\Lambda} + 1 \right|^\gamma & z \le 0 \\ 1 - (1-m) \times \left| \frac{2z}{(1-D)\Lambda} - 1 \right|^\gamma & z > 0 \end{cases} \quad (5)$$

where $w_{min}$ is the minimum GW width. Both sidewalls usually have the same grating period, Λ, however. m is between 0 and 1 and sets the midpoint at which the curve turns over and γ is the exponent parameter that varies the curve from cusp-like (γ=0) to triangle-like (γ=1) to square-like (γ=∞). The functional form describes the variation of the width for half of the waveguide (from the center of the waveguide).

Figure 7:
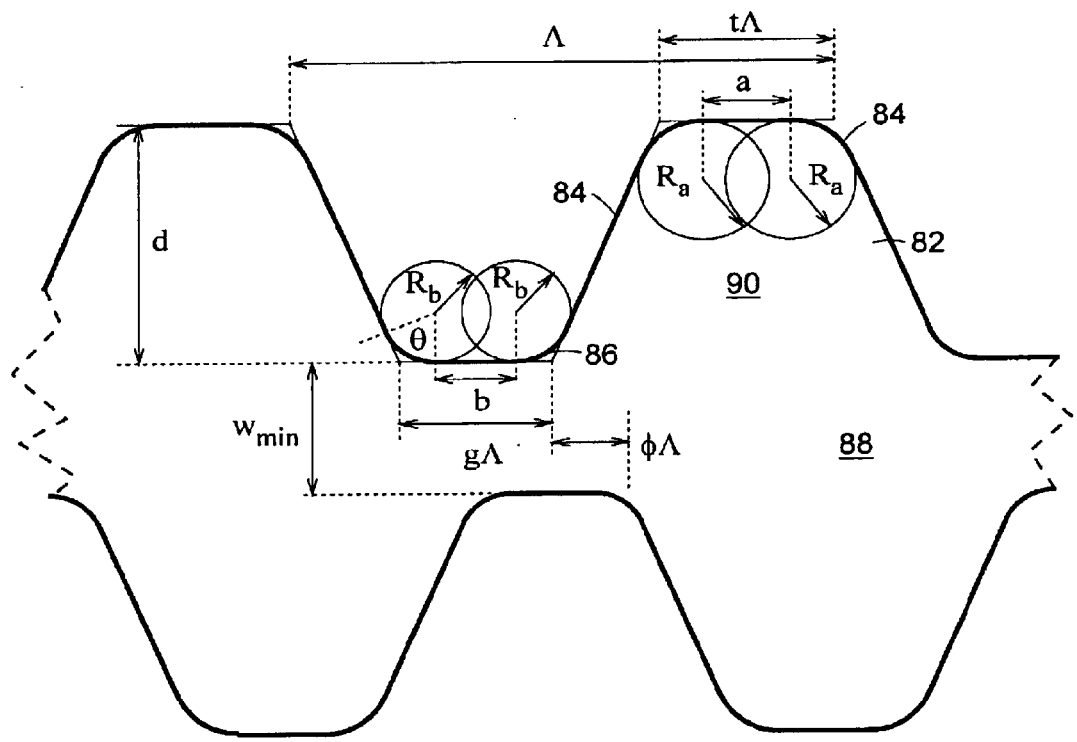
FIG. 7 is a plan view illustrating radial corner tooth shape parameters and dimensions according to one embodiment of the invention.

FIG. 7 is a plan view illustrating an exemplary embodiment of the invention in which gratings on each waveguide sidewall are used with radial corner tooth shape parameters and dimensions. It further utilizes chamfers 84 and fillets 86 in the profile of the sidewall grating 82 to increase manufacturability in existing photolithographic systems. Specifically, fillet radii $R_b$ define the sidewall profile at the intersection between waveguide body 88 and the base of tooth 90. Chamfer radii $R_a$ define the sidewall profile at the outer extent of the tooth 90. Typically, the photolithographic process used to fabricate the GW will dictate the lower limit for the fillet radii $R_b$ and the chamfer radii $R_a$.

Parameter $w_{min}$ is the minimum GW width, or width of the waveguide body 88. The width of the outer edge of the tooth is tΛ where t is unitless. The width of the gap is gΛ, where g is unitless.

The following parameters define a grated waveguide with a 2.2 TeraHertz (THz) stopband width, which is polarization independent to <1%, and a midgap of 193.859 THz, which is polarization independent to 1 GigaHertz (GHz). The index of the core is 1.6, and the index of the cladding is 1.4451. The waveguide is 1.3 μm thick, tooth period or pitch Λ=0.518 μm, $w_{min}$=0.67 μm, tooth depth d=0.293 μm, gapwidth g=0.325, toothwidth t=0.55, $R_a$=0.07 μm, and $R_b$=0.07 μm. There is no phase offset between gratings, φ=0.

Figure 8A:
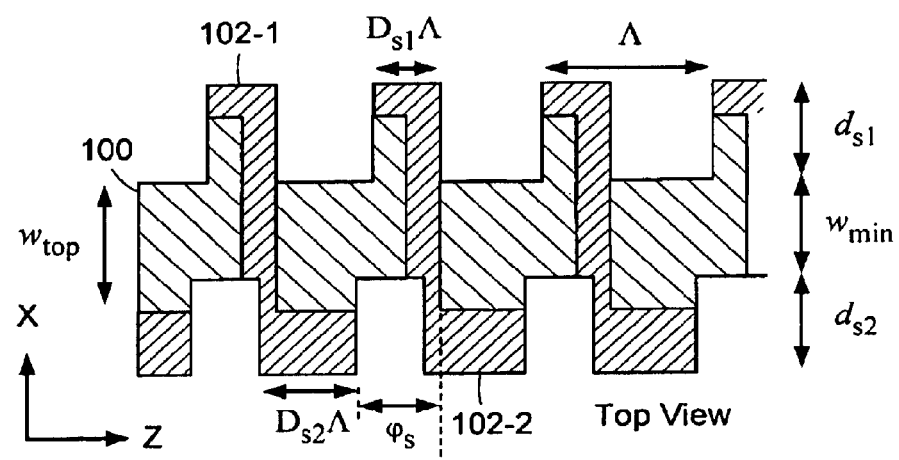
FIGS. 8A and 8B are plan and side views, respectively, of a waveguide with two sidewall gratings and a surface grating all having square tooth shapes with different duty cycles and phase offsets.
Figure 8B:
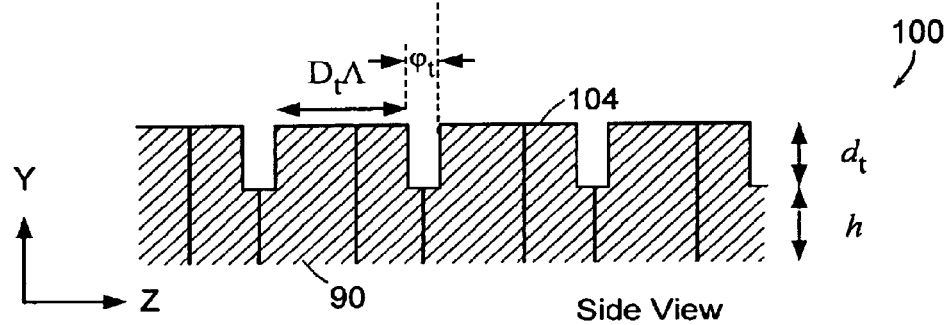

FIGS. 8A and 8B are plan and side views, respectively, of a waveguide 100 with two sidewall gratings and a surface grating all having square tooth shapes with different duty cycles and phase offsets. In this example, the waveguide 100 has sidewall grating teeth 102-1, 102-2, which are formed on each of the sidewalls, and top grating teeth 104, which are formed on the top of the waveguide 100. Each grating 102-1, 102-2, and 104 is parameterized by the amplitude of the teeth, the duty cycle of the teeth, a relative phase offset, the length of the tooth, the core width (distance from the center of the waveguide to the minimum of the tooth amplitude), and the grating period.

Generally, the three grating waveguide 100 using square tooth shapes can be designed for polarization insensitivity by control of the following parameters:

the amplitudes of the teeth on the sides and the top of the waveguide, $d_{s1}$, $d_{s2}$, and $d_t$;

the duty cycle of the teeth on the sides and top of the waveguide, $D_{s1}$, $D_{s2}$, and $D_t$;

the phase offset between the teeth on the sides and the teeth on the top, $\phi_t$;

the relative phase offset between the teeth on the two sides of the waveguide, $\phi_s$;

the width of the region etched out of the top surface of the waveguide, $w_{top}$;

the minimum width of the core section, $W_{min}$;

the thickness of the core at its thickest part, h; and the grating period, Λ.

Figure 9:
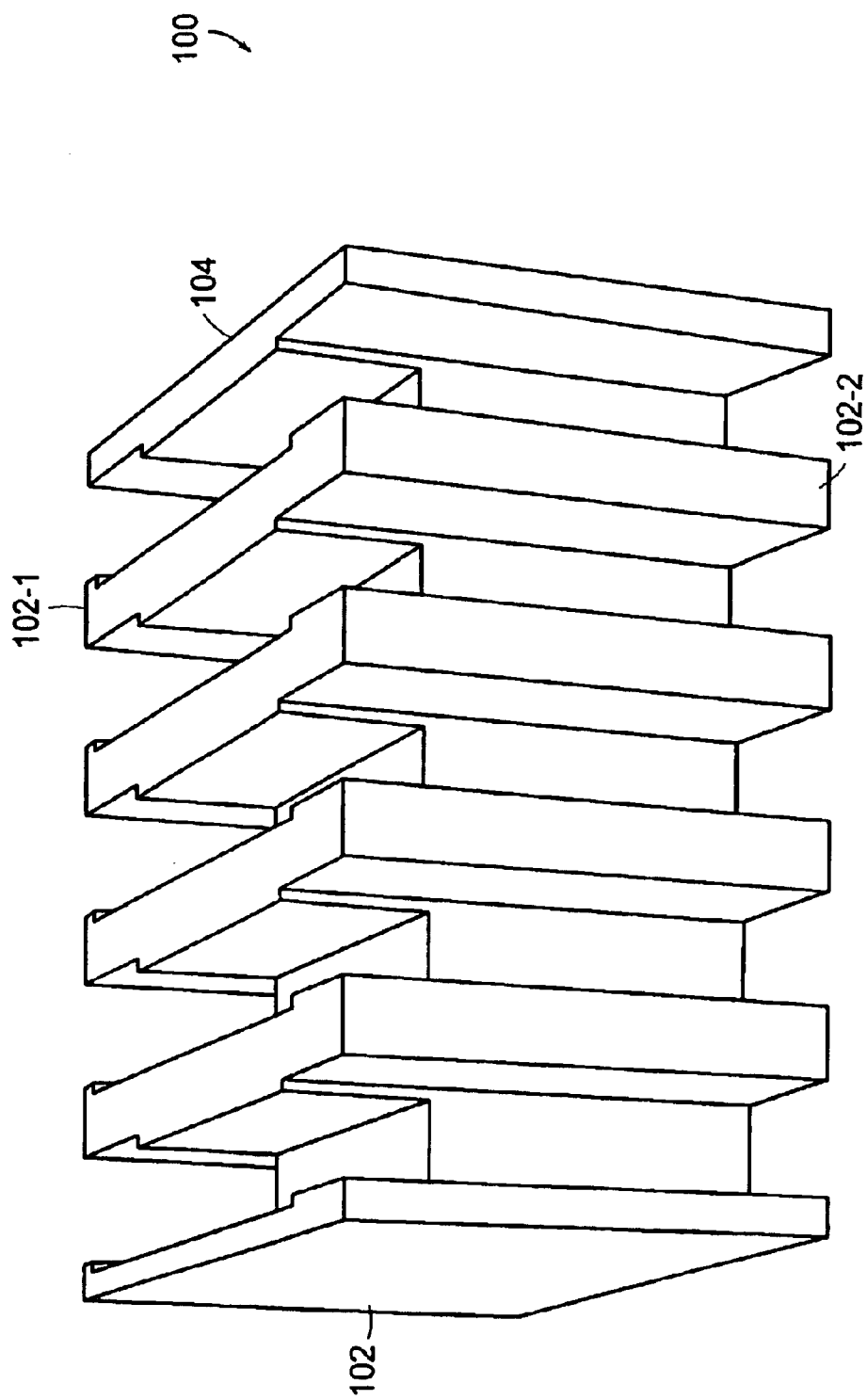
FIG. 9 is a perspective view of a waveguide with two sidewall gratings and a surface grating all having square tooth shapes.

FIG. 9 is a perspective view of a waveguide 100 with two sidewall gratings 102-1, 102-2 and a surface grating 104 all having square tooth shapes. The design shows a phase offset between the teeth on the sides and the teeth on the top, $\phi_t$. The tooth shape is primarily adjusted using the tooth amplitude and duty cycle to achieve polarization insensitivity in terms of the effective indices of refraction and grating strength for the polarization modes.

Generally, a GW with square teeth can be rendered polarization insensitive by control over sidewall phase offset and duty cycle, without requiring the top teeth 104.

Figure 10A:
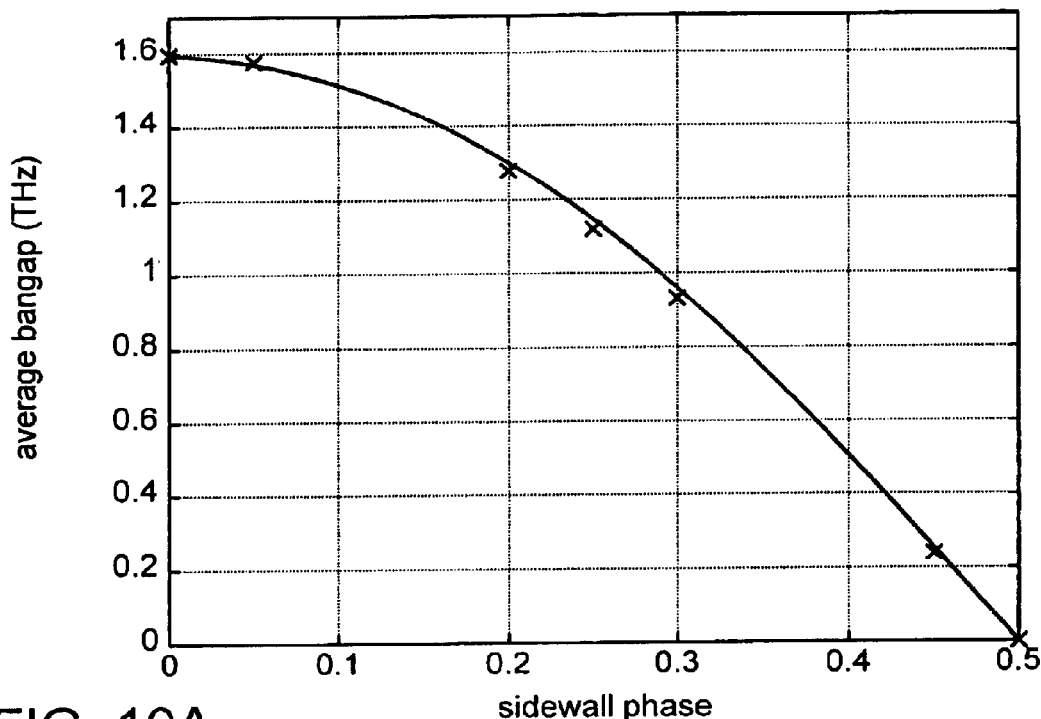
FIG. 10A is a plot of the average bandgap for the two polarization modes as a function of phase offset between the two sidewall gratings of a grated waveguide.
Figure 10B:
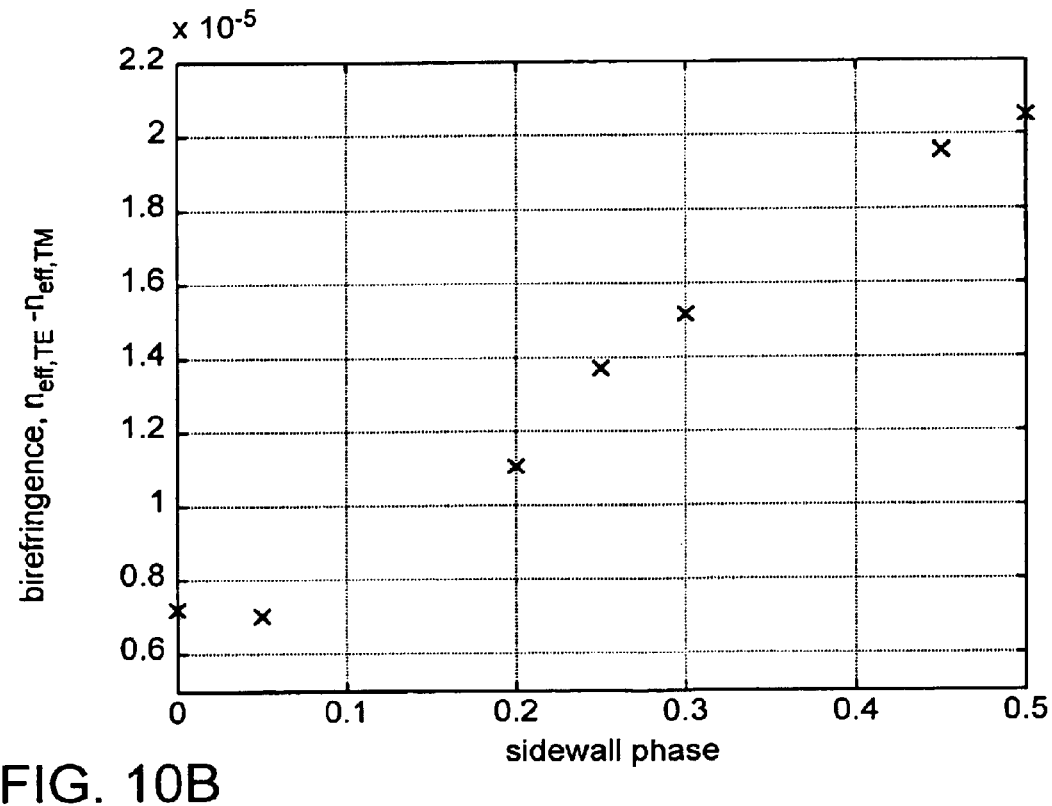
FIG. 10B is a plot of effective birefringence as a function of phase offset between the two sidewall gratings of a grated waveguide.
Figure 10C:
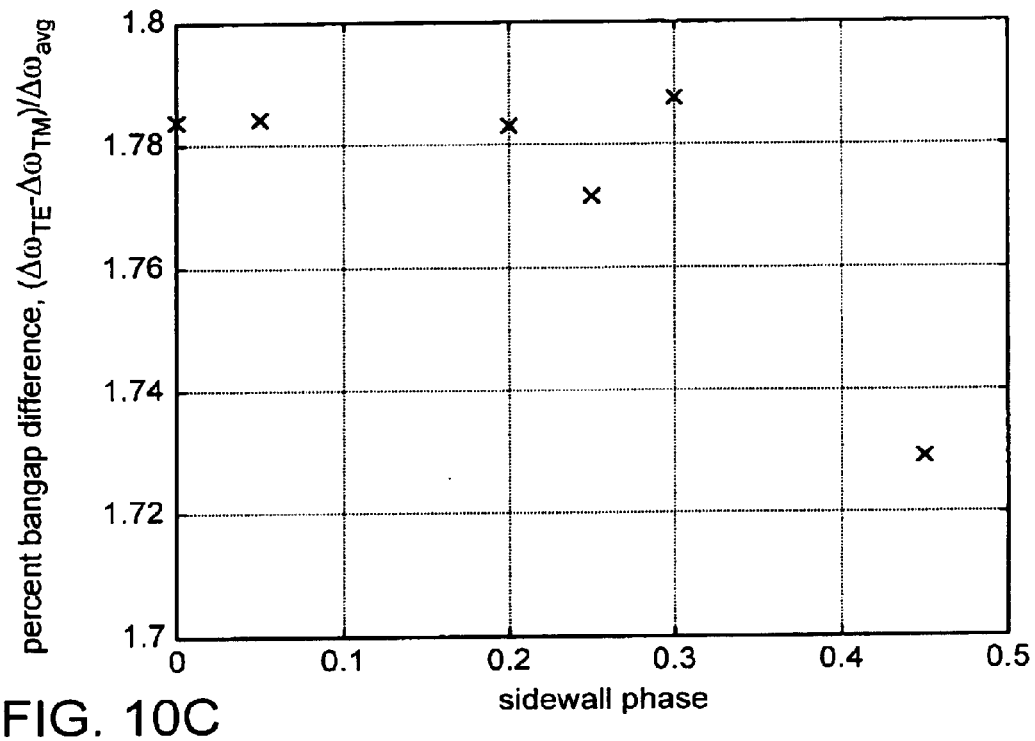
FIG. 10C is a plot of percent band gap difference for the two polarization modes as a function of phase offset between the two sidewall gratings of a grated waveguide.
Figure 10D:
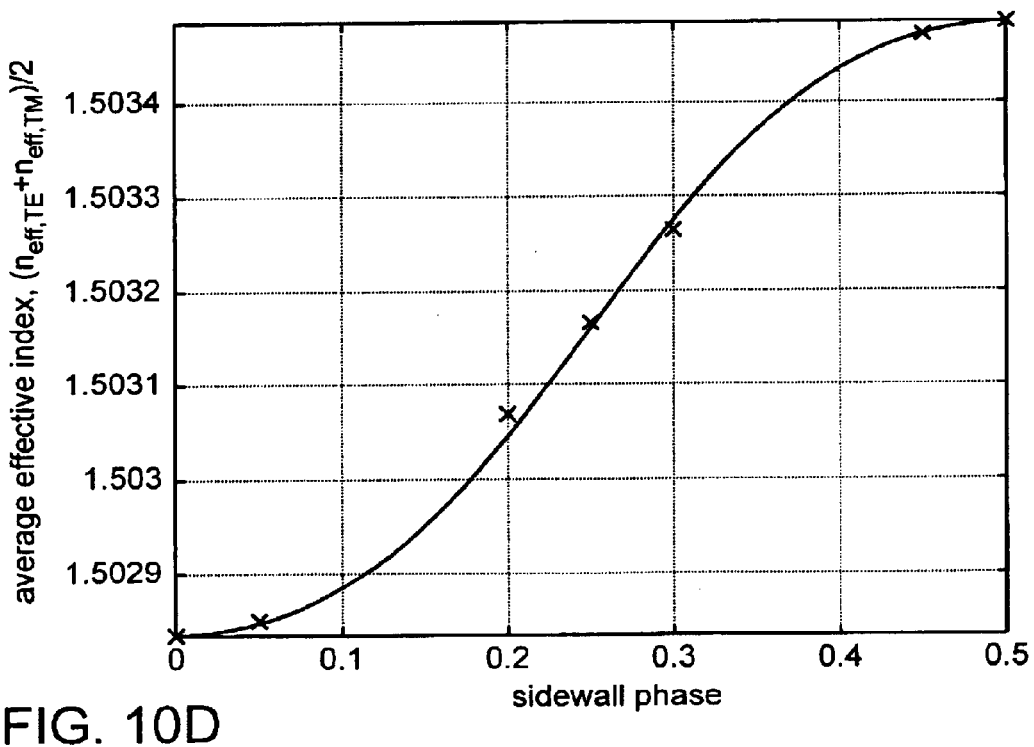
FIG. 10D is a plot of the average effective refractive index for the two polarization modes as a function of phase offset between the two sidewall gratings of a grated waveguide.

FIGS. 10A through 10D illustrate how a grating that has been engineered to be polarization independent for one grating strength can be modified to reduce the grating strength without significantly affecting the other properties. FIG. 10A is a plot of the average bandgap for the two polarization modes as a function of phase offset between the two sidewall gratings of a grated waveguide. FIG. 10C is a plot of percent band gap difference for the two polarization modes as a function of phase offset between the two sidewall gratings of a grated waveguide. FIG. 10D is a plot of the average effective refractive index for the two polarization modes as a function of phase offset between the two sidewall gratings of a grated waveguide. FIG. 10B is a plot of birefringence as a function of phase offset between the two sidewall gratings of a grated waveguide.

This tuning of the grating strength can be accomplished without impacting other design constraints such as the effective indices for each polarization mode and the polarization dependence of. In this example, the material system provides a core index of $n_{core}=1.6$, and a cladding index of $n_{cladding}=1.4451$. The side tooth depth d=0.272 µm, side duty cycle D=0.5193, $w_{min}=1.5238$ µm, and pitch Λ=0.522 µm.

Specifically, FIG. 10A shows that by changing the side wall phase offset between 0 and 0.5, the band gap changes from 1.6 THz to zero. This use of the phase offset to tune band gap, however, has little impact on the waveguide's polarization sensitivity.

For example, as shown in FIG. 10B, these same changes in the phase offset produce little change in the effective grating birefringence. FIG. 10C indicates that the polarization dependence of the stopband width varies by less than 0.1% with the changes to the phase offset. Finally, as shown in FIG. 10D, the average effective index changes by less than $7*10^{-4}$. The impact of this change on $\omega_c$ may be counter-balanced by adjusting the period, Λ slightly. FIG. 10D illustrates how polarization sensitivity can be changed by varying phase offset between sidewall gratings.

In yet another embodiment of the invention, the shape of the grating teeth is adjusted such that both polarization modes are equally coupled outside the waveguide to higher order spatial modes. Alternatively, the grating tooth shape can be adjusted for high polarization sensitivity so that only one polarization mode is coupled to a higher order spatial mode. The higher order modes have vertical directional components and can be used for out of plane coupling, such as for off-chip testing.

Figure 11:
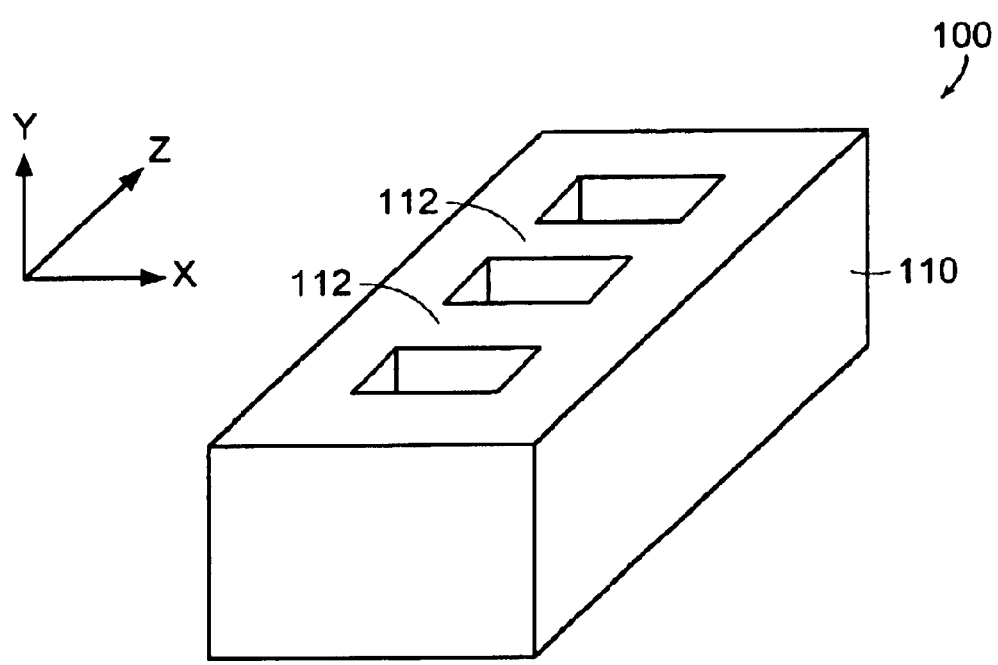
FIG. 11 is a perspective view of a grated waveguide with internal grating teeth according to the invention.

FIG. 11 is a perspective view of a grated waveguide 100 with internal grating teeth 112 according to the invention. The outside edges 110 of the waveguide 100 remain straight. The periodically varying index of refraction is inside the waveguide and grating teeth 112 are created internally.

In another exemplary embodiment of the invention, two polarization selective gratings are used to make up the ends of a resonant cavity.

The invention is also applicable to non-periodic waveguide structures with a varying effective index of refraction that can be characterized by an effective index and a perturbation strength. Examples of non-periodic waveguide structures with a varying index of refraction include chirped gratings and apodized gratings. The teeth of the chirped grating can be shaped to obtain polarization insensitivity.

The perturbation strength of the varying index describes the modal overlap of the individual polarization modes with the waveguide perturbation. The perturbation strength describes the modal overlap in both periodic and non-periodic waveguide structures. For example, the grating strength is the perturbation strength of a periodic grating.

While this invention has been particularly shown and described with references to preferred embodiments thereof, it will be understood by those skilled in the art that various changes in form and details may be made therein without departing from the scope of the invention encompassed by the appended claims.

What is claimed is:

1. A planar waveguide comprising at least one grating along the direction of propagation in which grating teeth have a non-square profile to control a polarization sensitivity of the waveguide.

2. A planar waveguide as claimed in claim 1, wherein a length of a base of the teeth is different from a length of a top of the teeth.

3. A planar waveguide as claimed in claim 1, wherein a length of a base of the teeth is greater than a length of a top of the teeth.

4. A planar waveguide as claimed in claim 1, wherein an effective index of the waveguide is substantially the same for each polarization mode.

5. A planar waveguide as claimed in claim 1, wherein strength of the grating is substantially the same for each polarization mode.

6. A planar waveguide as claimed in claim 1, wherein a profile of the teeth is generally trapezoidal.

7. A planar waveguide as claimed in claim 6 further comprising fillets at intersections between the teeth and a waveguide body.

8. A planar waveguide as claimed in claim 1 further comprising chamfers at tops of the teeth.

9. A planar waveguide as claimed in claim 1 wherein one grating is formed on each of at least two sides of the waveguide.

10. A planar waveguide as claimed in claim 1 wherein one grating is formed on each of two opposite sides of the waveguide.

11. A planar waveguide comprising at least two gratings with the same period that are phase-shifted relative to each other, wherein an effective index of the waveguide is substantially the same for each polarization mode.

12. A planar waveguide as claimed in claim 11, wherein strength of the grating is substantially the same for each polarization mode.

13. A planar waveguide as claimed in claim 11 wherein one grating is formed on each of two opposite sides of the waveguide.

14. A planar waveguide as claimed in claim 11 wherein one grating is formed on each of two opposite sides of the waveguide.

15. A planar waveguide comprising at least two gratings with the same period that are not phase-shifted relative to each other, wherein an effective index of the waveguide is substantially the same for each polarization mode.

16. A planar waveguide as claimed in claim 15, wherein strength of the grating is substantially the same for each polarization mode.

17. A planar waveguide as claimed in claim 15 wherein one grating is formed on each of two opposite sides of the waveguide.

18. A planar waveguide as claimed in claim 15 wherein one grating is formed on each of two opposite sides of the waveguide.

19. A design process for a polarization insensitive grated waveguide, the process comprising:
   balancing an index of refraction for each polarization mode by selecting a cross-section of the waveguide; and
   balancing a strength of the grating for each polarization mode by selecting a non-square profile of grating teeth.

20. A design process as claimed in claim 19, wherein the step of balancing the strength comprises selecting a profile in which a length of a base of the teeth is different from a length of a top of the teeth.

21. A design process as claimed in claim 19, wherein the step of balancing the strength comprises selecting a profile in which a length of a base of the teeth is greater than a length of a top of the teeth.

22. A design process as claimed in claim 19, wherein an effective index of the waveguide is substantially the same for each polarization mode.

23. A design process as claimed in claim 19, wherein a strength of the grating is substantially the same for each polarization mode.

24. A design process as claimed in claim 23, wherein the step of balancing the strength comprises selecting a profile in which the teeth are generally trapezoidal.

25. A design process as claimed in claim 19 wherein one grating is formed on each of at least two sides of the waveguide.

26. A design process as claimed in claim 19 wherein one grating is formed on each of two opposite sides of the waveguide.

27. A design process for a polarization insensitive grated waveguide, the process comprising:
   balancing an index of refraction for each mode by selecting a cross-section of the waveguide; and
   balancing a strength of the grating for each mode by selecting a non-50% duty cycle of grating teeth.

28. A design process for a polarization insensitive grated waveguide, the process comprising:
   balancing an index or retraction for each mode by selecting a cross-section of the waveguide; and
   balancing a grating strength for each mode by configuring the waveguide with two gratings and offsetting the phase of the gratings with respect to each other.

29. A design process as claimed in claim 28 wherein one grating is formed on each of at least two sides of the waveguide.

30. A design process as claimed in claim 28 wherein one grating is formed on each of two opposite sides of the waveguide.

31. A polarization controlled electromagnetic waveguide comprising a periodically varying index of refraction along the length of said waveguide, wherein the geometry of said periodically varying index is configured over each period such that the grating strength of each polarization mode is equal to a desired value and the effective indices of the polarization modes are equal to each other.

32. A polarization controlled electromagnetic waveguide as claimed in claim 31 wherein one grating is formed on each of at least two sides of the waveguide.

33. A polarization controlled electromagnetic waveguide as claimed in claim 31 wherein one grating is formed on each of two opposite sides of the waveguide.

* * * * *